United States Patent
Litorell et al.

(10) Patent No.: US 8,151,748 B2
(45) Date of Patent: Apr. 10, 2012

(54) INTERNAL COMBUSTION ENGINE COMPRISING A VARIABLE VALVE LIFT PROFILE SYSTEM AND A METHOD FOR CONTROLLING VALVE LIFT PROFILE SHIFTING

(75) Inventors: Martin Litorell, Göteborg (SE); Thomas Lyngfelt, Olofstorp (SE)

(73) Assignee: Volvo Car Corporation, Gothenburg (SE)

( * ) Notice: Subject to any disclaimer, the term of this patent is extended or adjusted under 35 U.S.C. 154(b) by 540 days.

(21) Appl. No.: 11/759,011

(22) Filed: Jun. 6, 2007

(65) Prior Publication Data
US 2008/0017144 A1 Jan. 24, 2008

(30) Foreign Application Priority Data
Jun. 28, 2006 (EP) .................................... 06116190

(51) Int. Cl.
F01L 1/34 (2006.01)
(52) U.S. Cl. ................ 123/90.15; 123/90.16; 123/90.17
(58) Field of Classification Search ............... 123/90.15, 123/90.16, 90.17, 90.18, 90.48; 701/112
See application file for complete search history.

(56) References Cited

U.S. PATENT DOCUMENTS

| | | | |
|---|---|---|---|
| 5,031,583 A | 7/1991 | Konno | |
| 5,287,830 A | 2/1994 | Dopson | |
| 5,531,203 A * | 7/1996 | Komatsuda et al. | 123/481 |
| 5,881,690 A | 3/1999 | Park | |
| 5,950,583 A | 9/1999 | Kraxner et al. | |
| 6,135,077 A | 10/2000 | Moriya et al. | |
| 6,230,675 B1 | 5/2001 | Kobayashi et al. | |
| 6,574,544 B1 * | 6/2003 | Yoshizawa et al. | 701/102 |
| 6,581,564 B2 | 6/2003 | Ogawa et al. | |
| 6,615,129 B2 * | 9/2003 | Kabasin | 701/110 |
| 6,615,775 B2 * | 9/2003 | Takemura et al. | 123/90.15 |
| 6,848,403 B2 | 2/2005 | Litorell | |
| 7,469,667 B2 * | 12/2008 | Leone et al. | 123/90.15 |
| 2002/0100441 A1 * | 8/2002 | Maeda | 123/90.16 |
| 2005/0049819 A1 * | 3/2005 | Longnecker et al. | 702/132 |
| 2005/0103291 A1 * | 5/2005 | Magner et al. | 123/90.16 |
| 2007/0113805 A1 | 5/2007 | Litorell et al. | |
| 2007/0113807 A1 | 5/2007 | Lyngfelt et al. | |
| 2007/0113808 A1 | 5/2007 | Lyngfelt et al. | |

FOREIGN PATENT DOCUMENTS

| EP | 1350936 | 8/2005 |
|---|---|---|
| EP | 1363002 | 6/2006 |

OTHER PUBLICATIONS

U.S. Appl. No. 11/556,726, filed Nov. 6, 2006, Litorell et al.
U.S. Appl. No. 11/556,732, filed Nov. 6, 2006, Litorell et al.
U.S. Appl. No. 11/556,737, filed Nov. 6, 2006, Litorell et al.
SAE 2000-01-1227, "The Third Generation of Valvetrains-New Fully Variable Valvetrains for Throttle-Free Load Control", Flierl et al, SAE 2000 Word Congress, Detroit, MI, Mar. 6-9, 2000.

* cited by examiner

*Primary Examiner* — Zelalem Eshete
(74) *Attorney, Agent, or Firm* — Alleman Hall McCoy Russell & Tuttle LLP (57) ABSTRACT

A method for an internal combustion engine that reduces the possibility of misfire during transitions between a lower valve lift mode and a higher valve lift mode.

19 Claims, 4 Drawing Sheets

INTERNAL COMBUSTION ENGINE COMPRISING A VARIABLE VALVE LIFT PROFILE SYSTEM AND A METHOD FOR CONTROLLING VALVE LIFT PROFILE SHIFTING

FIELD

The present description relates to an internal combustion engine comprising as least one cylinder with a piston, at least one intake valve at each cylinder, a variable valve lift profile system adapted to actuate the intake valve selectively in either of at least two valve lift profile modes, and a variable valve timing system adapted to adjust the timing of the intake valve actuation.

BACKGROUND

The inventors herein have discovered that in an internal combustion engine with variable valve lift profile system, for example a cam profile shifting (CPS) system as described in U.S. Pat. No. 5,287,830, switching the valve lift profile mode from a low lift profile mode to a high lift profile mode can cause misfire. This circumstance may be especially prominent at cold start conditions, particularly at low ambient temperatures.

The inventors herein have developed a method to control mode switching such that engine misfires are reduced.

SUMMARY

The present method can avoid or reduce the risk of engine misfire when changing valve lift modes in a variable valve lift profile system of an internal combustion engine.

Misfires are reduced by a variable valve timing system is controlled such that during a mode change from a first valve lift profile mode to a second valve lift profile mode, wherein the second valve lift mode has a higher valve lift profile than the first valve lift profile, the amount of air captured in the cylinder during an engine cycle is reduced as a result of the mode change.

The amount of air captured in the cylinder during an engine cycle corresponds to the effective air flow into the cylinder(s), i.e., air entering the cylinder(s) and not leaving the cylinder(s) through the intake or exhaust valve(s), for example due to the intake valve(s) closing after the piston has reached the bottom dead center position.

The inventors have discovered that the cause of misfire during valve lift profile mode switches from a low profile mode to a high profile mode is a lean peak in the air-fuel mixture that occurs immediately after the valve mode switch. By controlling a variable valve timing system at a mode change so that the amount of air captured in the cylinder during an engine cycle is smaller immediately after the mode change than immediately before the mode change, the lean peak will be reduced or eliminated. This method will prevent the mixture from becoming so lean such that is causes misfire, and the method is described in detail below.

In one example, the variable valve timing system is controlled so that the timing of the intake valve actuation is retarded during the mode change. In the case where the closing of the valve is after bottom dead center during a higher valve lift mode, retarding the valve timing will increase the amount of air pushed back into the intake manifold, thereby reducing the amount of air captured in the cylinder. As will be described closer below, this will reduce the air-fuel ratio immediately after a valve lift profile mode change to the high lift profile mode.

In one example, at the mode change, in the mode with a lower valve lift, a large part of the period during which the valve is open falls within a period during which the piston moves from the top dead center position to the bottom dead center position. This will allow substantially all air inducted to be captured in the cylinder, so that the ratio between air captured in the mode with a lower valve lift, and air captured in the mode with a higher valve lift can be increased.

At the mode change, in the mode with a higher valve lift, the intake valve can open before the bottom dead center position of the piston, for example 130-180 crankshaft degrees before the bottom dead center position, and close after the bottom dead center position of the piston, for example 70-120 crankshaft degrees after the bottom dead center position. This will reduce the amount of air inducted into the cylinder during the mode with a higher valve lift, which will, as explained in more detail below, reduce the air-fuel ratio, so as to reduce the risk of misfire.

In one example, the method comprises determining whether the engine temperature is below a temperature threshold value. If so, the variable valve timing system is controlled so that the amount of air captured in the cylinder is reduced as a result of the mode change. When the engine and the oil used for the CPS system actuation are not warm, delays may occur in the CPS system due to a relatively high oil viscosity of the oil used for the CPS system. This will make it difficult to synchronize any fuel enrichment compensation with the CPS system mode shift. Thus, determining whether the engine temperature is below a temperature threshold value will make it possible to use the method in situations when it is especially needed, i.e., at low engine temperature situations.

The above advantages and other advantages and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
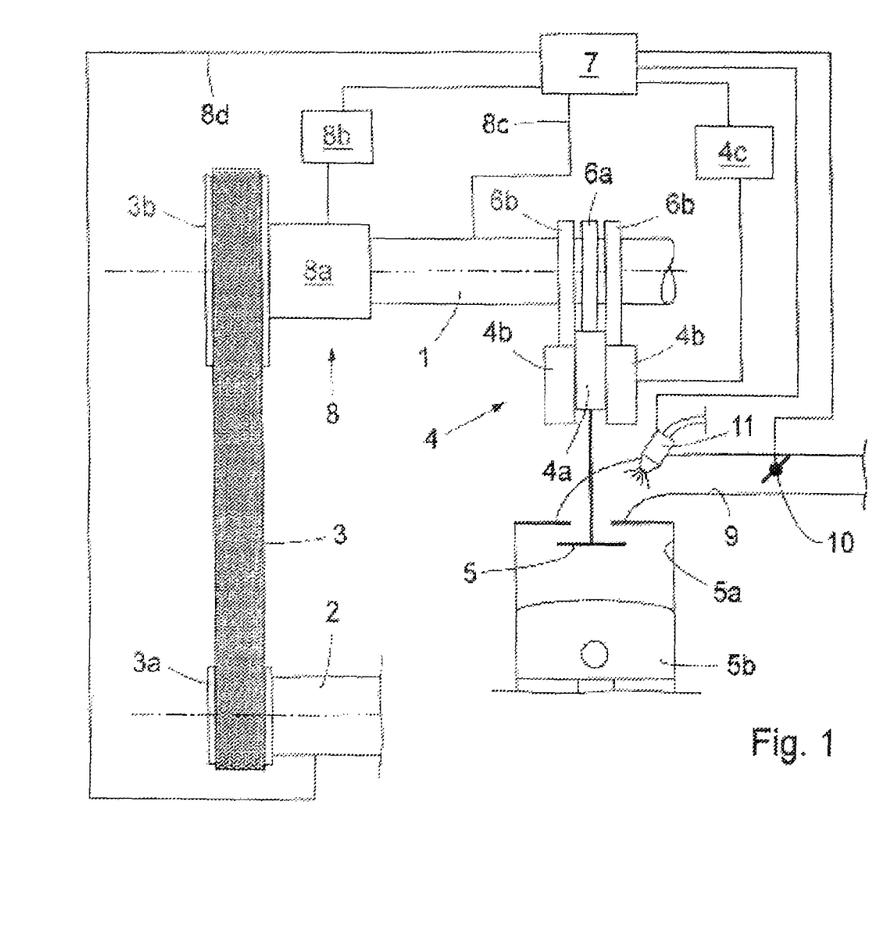
FIG. 1 is a schematic view of parts of an internal combustion engine, comprising a variable valve timing system and a variable valve lift profile system, the latter in the low lift position.

FIG. 1 shows schematically parts of a naturally aspirated internal combustion engine. A camshaft 1 is driven by crankshaft 2 vial a belt (or chain) 3, a crankshaft wheel 3a, and a camshaft wheel 3b in a manner known in the art. The engine comprises a variable valve lift profile system 4 adapted to change the lift profile of intake and/or exhaust valves of the engine, e.g., the amount and duration of lift at individual valve motions. Here the variable valve lift profile system is provided in the form of a cam profile shifting (CPS) system 4 that is adapted to change the lift profile of intake and/or exhaust valves of the engine. This is accomplished by changing the valve lift provided by cam lobes 6a and 6b of camshaft 1. In FIG. 1 only one valve is shown. It takes the form of an intake valve 5 at a cylinder 5a with a piston 5b. In this example, for each valve 5 there is provided one low lift cam lobe 6a and two high lift cam lobes 6b.

In operation, each of the cam lobes 6a and 6b acts on valve actuator parts 4a and 4b located between the cam lobes and the valve. The valve actuator parts are connected by connecting means (not shown), in turn controllable by a CPS hydraulic control system 4c. In turn, the CPS hydraulic control system 4c is controllable by and engine control unit (ECU) 7. ECU 7 has computational capabilities and storage capabilities, and can be formed by one or more physically separate but logically connected devices. As is know to those skilled in the art, the current CPS system 4 setting can be determined by the ECU 7, for example by measuring operational parameters relevant to the CPS setting. In a low lift profile mode, show in FIG. 1, the valve actuator parts 4a and 4b are not fixed to each other, which results in the valve lift being controlled by the low lift cam lobe 6a.

Figure 2:
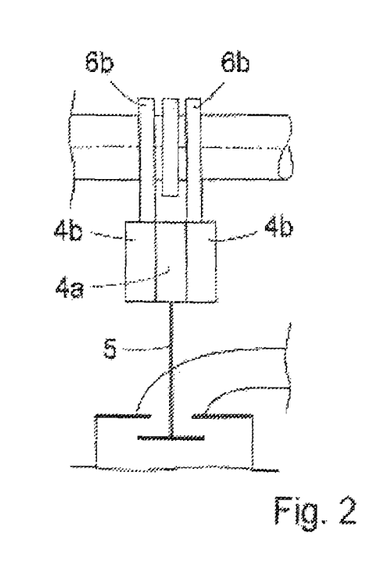
FIG. 2 is a detail of the view in FIG. 1, where the cam profiles have been shifted to the high lift position.

As can be seen in FIG. 2, in a high lift profile mode, the valve actuator parts 4a and 4b are fixed to each other so that the valve motion is controlled by the high lift cam lobes 6b.

Alternatively, still within the scope of the present description, the variable valve lift profile system 4 can be provided in a variety of manners known in the art, for example as described in U.S. Pat. No. 5,950,583. In particular, the CPS actuator can be provided in alternative manners, and the CPS system can be adapted to assume more than two valve lift profile modes, or cam profile modes. As a further alternative, the variable valve lift profile system 4 can be provided with valves that can be actuated independently of each other, for example by use of electromagnetic actuators.

The engine also comprises a variable valve timing (VVT) system 8, which is adapted to set the camshaft 1 at desired angular positions in relation to the camshaft wheel 3b. The VVT system comprises a timing actuator 8a, for example of the type described in U.S. Pat. No. 6,135,077, at the camshaft wheel 3b. The timing actuator 8a is controllable by a VVT hydraulic control system 8b. (It should be noted that the VVT system 8 can alternatively be controlled electrically or mechanically) In turn, the VVT hydraulic control system 8b is controlled by the ECU 7. Also, by means of a connection 8c to a cam phase detector and a connection to 8d to a crankshaft position detector, the ECU can determine a current value of the VVT position.

Also provided are means (not shown) to establish the engine speed, and the rotational position of the crankshaft (2) and camshaft(s) (1), in a manner known in the art.

As can be seen in FIG. 1, in an intake manifold 9, a throttle valve 10 is controllable by the ECU 7. Downstream of the throttle valve 10 is a fuel injector 11. It should be noted that the description is equally applicable to an engine with fuel injection directly into the respective cylinders.

Figure 3:
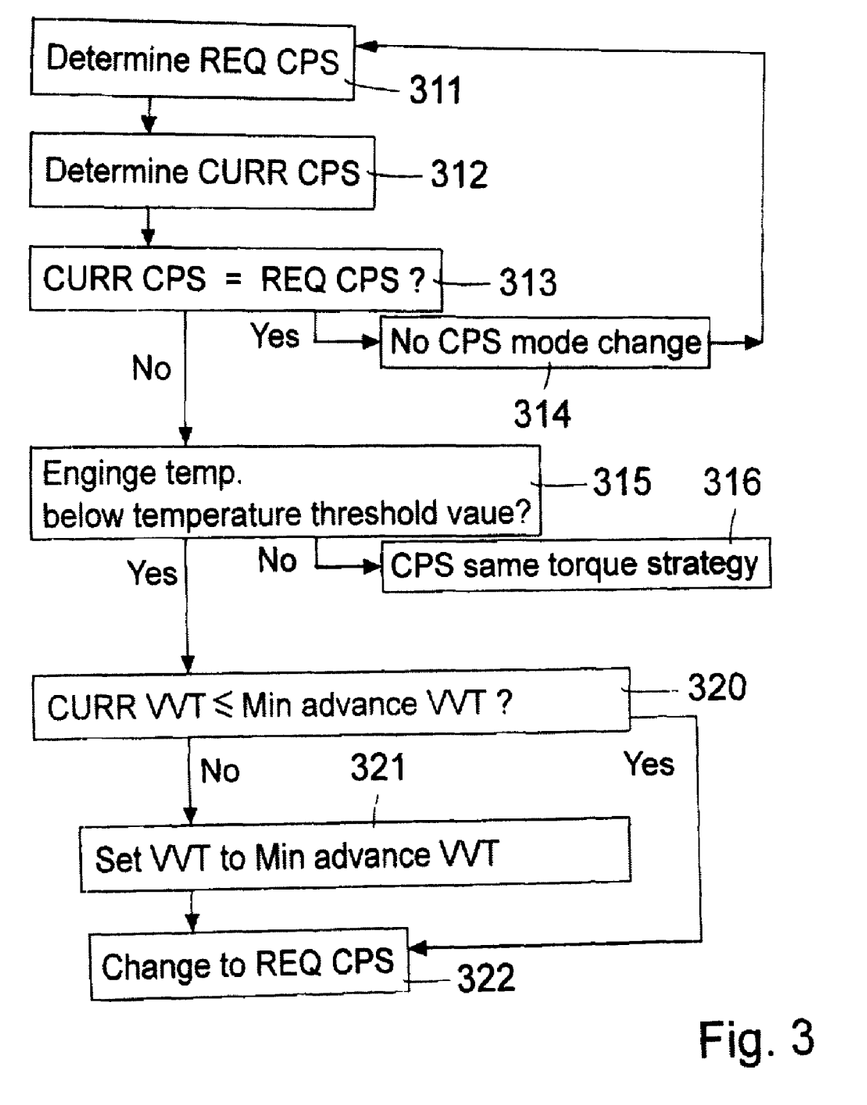
FIG. 3 is a block diagram depicting a method according to a first embodiment of the description.

Reference is made to FIG. 3. The ECU 7 is adapted to determine 311 a requested CPS mode RECCPS and a current CPS mode CURRCPS 312, and determine 313 whether the requested CPS mode RECCPS and current CPS mode CURRCPS are identical. If they are identical, no CPS mode change is carried out 314.

As mentioned, the inventors have discovered that the air-fuel mixture becomes leaner during a CPS system shift from the low lift profile mode LL to the high lift profile mode HL. This mixture phenomenon will be described closer below with reference to FIG. 4. A lean mixture can relatively easily cause misfire, while a mixture can be very rich until misfire occurs. One way of solving the misfire problem is thus to increase the flow of injected fuel when a CPS system shift is carried out. However, when the engine, and particularly the oil used for the CPS system actuation is not warm, delays might occur in the CPS system due to a relatively high viscosity of the oil used for the CPS system. This will make it difficult to synchronize the fuel enrichment compensation with the CPS system mode shift. In turn, the mixture may become lean and one or more misfires may occur during a CPS system shift.

Therefore, if the requested CPS mode RECCPS and the current CPS mode CURRCPS are not identical, and if the current CPS mode is the low lift profile mode LL, it is determined whether the engine temperature is below a temperature threshold value 315. In one example, the temperature threshold value is a predetermined value, chosen so that at temperatures above it, there is a low risk of a lack of synchronization between CPS mode shift and any fueling compensation, which could cause misfire.

If the engine temperature is not below the temperature threshold value, the ECU 7 controls the CPS system according to a CPS same torque strategy 316. Such a strategy is described in European Patent Application 05110939.5, incorporated herein by reference, and includes controlling the variable valve timing system so as to reduce the difference between two valve lift profile modes regarding the output torque of the engine.

According to the description, in order to reduce the possibility of misfire, the VVT system is controlled so that the amount of air captured in the cylinder is reduced as a result of the CPS mode change. According to one embodiment, further described below with regard to FIG. 5, this VVT system control includes setting the VVT system to a the fully retarded position. Thus, if the engine temperature is below the temperature threshold value, it is determined 320 whether the current VVT position CURRVVT is at the minimum advance VVT position, below also referred to as a fully retarded VVT setting, that is whether the VVT setting is at an operational limit thereof, in which the intake valve(s) open as late as possible. If the current VVT position CURRVVT is at a minimum advance VVT position, the CPS mode is changed 322 to the requested CPS mode REQCPS, i.e., the high lift profile mode HL. If the current VVT system is not at the minimum advance VVT position, the VVT system is controlled 321 so as to move the VVT position to the minimum advance VVT position, before changing the CPS mode.

Figure 4:
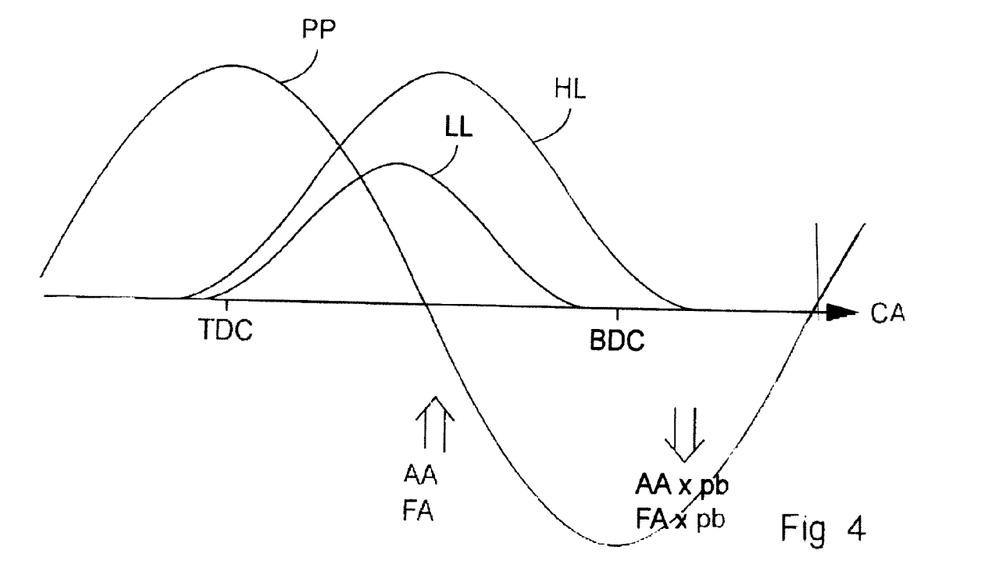
FIG. 4 is a diagram showing a cylinder piston position and two valve lift profiles as functions of the crankshaft angle CA.
Figure 5:
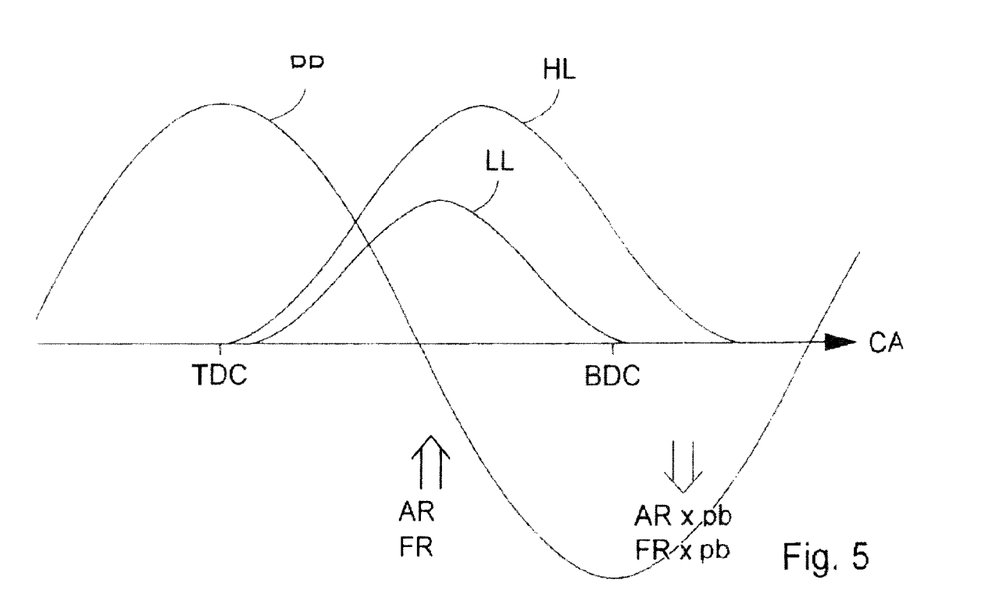
FIG. 5 is a another diagram showing a cylinder piston position and two valve lift profiles as functions of the crankshaft angle CA.

With reference to FIG. 4 and FIG. 5, the effect of moving, before changing the CPS mode, the WT position to the minimum advance VVT position, thus reducing at the CPS mode change the amount of air captured in the cylinder(s), will be described closer. In FIGS. 4 and 5 the piston position PP in the cylinder 5a, the low lift profile LL, here also referred to as the first valve lift profile LL, and the high lift profile HL, here also referred to as the second lift profile HL, are indicated as functions of crankshaft angle CA. The distances of valve motion in the respective lift profile modes can of course vary. Suitably, in the low lift profile mode LL the maximum intake valve lift is 2 to 8 mm, preferably 2.5 to 6 mm, and more preferably substantially 3.5 mm, and in the high lift profile mode HL the maximum intake valve lift is 7-12 mm, preferably 9-11 mm, and more preferably substantially 10 mm.

As can be seen in FIGS. 4 and 5, the duration of the valve actuation differs from one valve lift profile mode to another. Suitably, in the low lift profile mode LL, the valve actuation duration is 100-200 crankshaft degrees, preferably 125-175 crankshaft degrees, and more preferably substantially 150 crankshaft degrees, and in the high lift profile mode HL, the valve actuation duration is 200-300 crankshaft degrees, preferably 225-275 crankshaft degrees, and more preferably substantially 250 crankshaft degrees.

Also, the timing of the low lift LL valve actuation is related to the timing of the high lift HL valve actuation such that the timing of the closing of the intake valve 5 is more retarded in the high lift profile mode HL than in the low lift profile mode LL. This difference between the modes regarding the valve closing crankshaft angle position may of course vary, preferably between 50-150 crankshaft degrees, more preferably 70-120 crankshaft degrees. In this example, the intake valve 5 closes approximately 90 crankshaft degrees later in the high lift profile mode HL than in the low lift profile mode LL.

In the example here, the timing of opening of the valve in the low lift profile mode LL is slightly retarded in relation to the valve opening timing in the high lift profile mode HL. However, alternatively, the valve opening timing can be the same in the lift profile modes, or the low lift profile valve opening timing can be more advanced than the high lift profile valve opening timing, or more retarded than in the example here.

The VVT system provides for the timing of the valve actuation to be moved to any position between a fully advanced position and a fully retarded position, the valves opening and closing at an earlier crankshaft position in the fully advanced position compared to the fully retarded position. Of course, the description is applicable also to VVT systems allowing none or only a limited number of valve timing positions between two extreme positions. The crank angle distance between the fully advanced position and a fully retarded position can of course vary from one engine model to another, but suitably this distance is 30-120 crankshaft degrees, preferably 40-90 crankshaft degrees, more preferably substantially 60 crankshaft degrees. In this example, the valve opening timing in high lift profile mode HL can be adjusted between 35 crankshaft degrees before top dead center TDC piston position in the fully advanced position, and 25 crankshaft degrees after the top dead center TDC piston position in the fully retarded position. The valve opening timings can of course vary between different engine models.

FIG. 4 illustrates the lift profiles HL and LL when the VVT setting is close to the fully advanced position. FIG. 5 illustrates the lift profiles HL and LL when the VVT setting is in a retarded position.

In the lift profile mode HL, and in the retarded VVT setting, preferably the intake valve 5 opens 130-180 crankshaft degrees before the bottom dead center BDC position of the piston 5$b$ and closes 70-120 crankshaft degrees after the bottom dead center BDC position of the piston 5$b$. In this example, the timing of the valve closing in the high lift profile mode HL, and in the fully retarded VVT setting, is approximately 95 crankshaft degrees after the bottom dead center BDC position of the piston. This means that the valve is open during a substantial portion of the compression stroke, which in turn means that a portion of the air inducted will be pushed back into the intake manifold 9, as will be more thoroughly discussed below.

In FIGS. 4 and 5, air and fuel inducted before the bottom dead center position BDC of the piston 5$b$ is denoted AAxi, FAxi, ARxi, FRxi, respectively. Further, in FIGS. 4 and 5, air and fuel pushed back after the bottom dead center position BDC of the piston 5$b$ is denoted AAxpb, FAxpb, ARxpb, FRxpb, respectively. In these connotations, used below, the first entry identifies air (A) or fuel (F), the second entry identifies advanced (A) or retarded (R)VVT setting, the third entry identifies the number (1, 2, or 3) of a cycle out of three consecutive engine cycles described below, and the fourth entry indicates whether the air or fuel is inducted (i) into, pushed back (pb) from or captured in the cylinder 5$a$.

The air and fuel captured in the cylinder 5$a$ are at least approximately equal to the difference between air and fuel, respectively, being inducted into and pushed back out of the cylinder, i.e., XXxc=Xxxi−XXXpb. Further, as also mentioned below, at each cycle of the cylinder 5$a$, all fuel injected by the fuel injector 11 is normally inducted before the bottom dead center BDC of the piston 5$b$, and the air fuel ratio RXx can be assumed to be the same mixture inducted, pushed back and captured, i.e., RXx=AXxi/FXxi=AXxpb/FXxpb=AXxc/FXxc. In the air-fuel ratio connotation, also used below, R denotes air-fuel ratio, the second entry identifies advanced (A) or retarded (R) VVT setting, and the third entry identifies the number (1, 2, or 3) of a cycle out of three consecutive engine cycles described below.

In the advanced VVT setting in FIG. 4, at least when operating at relatively low engine speeds, in both valve lift profile modes LL and HL, air will be inducted into cylinder only when the intake valve 5 is open and the piston is moving from the top dead center TDC to the bottom dead center BDC. If the intake valve 5 is open and the piston is moving from the bottom dead center BDC to the top dead center TDC, air will instead be pushed back into the intake manifold 9.

As can be seen in FIG. 4, in the low lift profile mode LL, almost the entire period during which the valve 5 is open falls within the period during which the piston moves from the top dead center TDC to the bottom dead center BDC, so that air is inducted during a substantial portion of the period during which the valve is open.

However, as can also be deducted from FIG. 4, also in the high lift profile mode HL, air is inducted during a substantial part of the period during which the valve is open, which combined with the higher valve lift of the valve, gives the result that a relatively larger amount of air is inducted during the high lift profile mode HL. Some of this air will be pushed back into the intake manifold 9, since the valve 5 is still open after the bottom dead center BDC of the piston. The valve timing can be adjusted so that the push-back effect in the high lift mode HL gives an amount of air captured in the cylinder, i.e., the amount inducted reduced by the amount pushed back, which is equal to the amount of air captured in the low lift mode LL, giving the same load and therefore the same torque in both modes.

In normal operation, all fuel for a single combustion is injected before bottom dead center BDC, and it can be assumed that all fuel from the fuel injector 11 for the engine cycle in question is inducted into the cylinder. Therefore, the air-fuel ratio will depend on the amount of air inducted into the cylinder 5$a$ before the piston bottom dead center BDC. It can be assumed that the mixture is homogenous, so that any air being pushed back into the intake manifold 9 after the bottom dead center BDC will be mixed with fuel to the same ratio.

More particularly, the condition associated with the air and fuel supply at a valve lift profile mode change, during an advanced VVT setting as shown in FIG. 4, can be exemplified as follows with three consecutive cycles of the cylinder, assuming that there are no effects of fuel condensation on the intake manifold.

First cycle (advanced VVT setting): The engine is operating in the low lift profile mode LL. The air-fuel ratio RA1 is the ratio between the air captured in the cylinder AA1c and the fuel captured in the cylinder FA1c.

$$RA1=AA1c/FA1c. \qquad \text{Equation 1:}$$

The amount of air captured AA1c is equal to the amount of air inducted into the cylinder, i.e., there is no push-back into the intake manifold. The amount of fuel captured in the cylinder FA1c is equal to the amount of fuel FA1i injected and inducted into the cylinder.

Second cycle (advanced VVT setting): This cycle follows the first cycle and the engine operation has been shifted to the high lift profile mode HL. The VVT setting is unchanged, i.e., still advanced. The air-fuel ratio RA2 during the second cycle will be equal to the ratio between the amount of air AA2c captured in the cylinder and the amount of fuel FA2c captured in the cylinder, i.e., RA2=AA2c/FA2c. The amount of air AA2c captured in the cylinder can be assumed to be equal to the amount of air AA2i inducted into the cylinder reduced by the amount of air AA2pb pushed back during the second cycle, after the bottom dead center BDC.

$$AA2c=AA2i-AA2pb \qquad \text{Equation 2:}$$

The advanced VVT setting is such that the amount of air captured is the same during the first and second cycles.

$$AA2c=AA1c \qquad \text{Equation 3:}$$

The amount of fuel FA2i injected and inducted during the second cycle, before the bottom dead center BDC, can be assumed to be the same as the fuel amount injected and captured during the first cycle.

$$FA2i=FA1i=FA1c \qquad \text{Equation 4:}$$

Part of the fuel inducted will be pushed back into the intake manifold and this part is denoted FA2pb. Thus, the amount of fuel FA2c captured in the cylinder is the difference between injected and pushed back fuel, i.e., FA2c=FA2i−FA2pb=FA1c−FA2pb, and the air-fuel ratio during the second cycle will be:

$$RA2=AA1c/(FA1c-FA2pb). \qquad \text{Equation 5:}$$

It can be seen that the denominator is smaller in RA2 than in RA1 (AA1c/FA1c) so that RA2>RA1, which means that the mixture captured in the cylinder will be leaner during the second cycle.

Third cycle (advanced VVT setting): This cycle follows the second cycle and the engine is still operating in the high lift profile mode HL. The VVT setting is unchanged, i.e., still advanced. The air-fuel ratio RA3 during the third cycle will be equal to the ratio between the amount of air AA3c capture in the cylinder and the amount of fuel FA3c captured in the cylinder, i.e., RA3=AA3c/FA3c. The amount of air AA3c captured in the cylinder is equal to the amount of air AA3i inducted into the cylinder reduced by the amount of air AA3pb pushed back during the third cycle, after the bottom dead center BDC, i.e., AA3c=AA3i−AA3pb. The advanced VVT setting such that the amount of air captured is the same during the first and third cycles, i.e., AA3c=AA1c.

The amount of fuel FA3i injected into the intake manifold during the third cycle is the same as the fuel amount injected and captured during the first cycle so that FA3i=FA1i=FA1c. However, at least a part of the fuel FA2pb pushed back during the second cycle will also be inducted into the cylinder during the third cycle. In this example, it is assumed that all fuel FA2pb pushed back during the second cycle is inducted during the third cycle. Therefore, the total amount of fuel inducted into the cylinder can be expressed as FA1c+FA2pb. Part of the fuel inducted will be pushed back into the intake manifold, and this part is denoted FA3pb. Thus, the fuel captured in the cylinder during the third cycle can be expressed as FA3c=FA1c+FA2pb−FA3pb. In this example, it is assumed that the same amount of fuel is pushed back during the second and third cycles, and the fuel captured in the cylinder during the third cycle can be expressed as FA3c=FA1c+FA2pb−FA3pb=FA1c. Thus, the air-fuel ratio during the third cycle will be:

$$RA3=AA1c/FA1c \qquad \text{Equation 6:}$$

It follows from comparing equations 1, 5, and 6 that the air-fuel ratio will be the same during the first and third cycles, but during the second cycle, there will be a lean peak.

$$RA1=RA3<RA2 \qquad \text{Equation 7:}$$

This can cause misfire during the second cycle. The lean peak can be increased by a fuel condensation effect. More specifically, since during the low lift profile mode LL, no or only a small amount of fuel is pushed back into the intake manifold 9 (see the first cycle described above), no or only a small amount of fuel is deposited on the interior walls of the intake manifold 9. Since, after the CPS mode change, fuel is being pushed back to a larger degree, some fuel will during the first cycle of the high lift profile mode HL deposit onto the manifold walls, reducing during the next cycle (i.e., the third cycle), the fuel inducted to the cylinder. Consequently, the lean peak may last for more than one engine cycle.

Referring to FIG. 5, the VVT system is adjusted so that the amount of air captured is reduced during the second cycle in relation to the first cycle. In this embodiment, the VVT position has been moved, before changing the CPS mode, to the fully retarded VVT position (i.e., the valve timing is retarded during the CPS mode change). As can be seen in FIG. 5, in the low lift profile mode LL, almost the entire period during which the valve 5 is open falls within the period during which the piston moves from the top dead center TDC to the bottom dead center (BDC). Consequently, as in the case of an advanced VVT setting shown in FIG. 4, air is inducted during a substantial part of the period during which the valve is open.

However, as can be seen in FIG. 5, in the high lift profile mode HL, compared to the advanced VVT setting as in FIG. 4, less air is inducted during the high lift profile mode HL, and more air is pushed back into the intake manifold, since a larger part of the period, during which the valve is open, falls after the bottom dead center BDC. The valve closing occasion in the high lift profile mode HL may of course vary, but in this example, the intake valve 5 closes approximately 93 crankshaft degrees after the bottom dead center position of the piston 5b, in the high lift profile mode HL.

As stated above, the air-fuel ratio will be dependent on the amount of fuel injected by the fuel injector 11, and the amount of air inducted into the cylinder 5a before piston bottom dead center BDC. Therefore, the air-fuel ratio will be richer than during the high lift profile mode HL in the advanced VVT setting as shown in FIG. 4.

More specifically, the air and fuel supply at the valve lift profile change, with a retarded VVT setting, can be exemplified as follows with two consecutive cycles of the cylinder:

First cycle (retarded VVT setting): The engine is operating in the low lift profile mode LL. Although the VVT setting is more retarded than in the example described with reference to FIG. 4, the VVT and CPS systems are adapted so that in the retarded VVT setting, the amount of air captured $AR1c$ during the low lift profile mode LL is substantially the same as when the WT setting is advanced.

$$AR1c = AA1c \quad \text{Equation 8:}$$

Since substantially all of the period during which the valve is open in the low lift profile mode LL falls, at both VVt settings, between the top and bottom dead center locations, TDC and BDC, this assumption (Eq. 8) can be said to be a good approximation of the air supply in a real operational situation. Also, the amount of air captured $AA1c$ is equal to the amount of air inducted into the cylinder (i.e., there is no push-back into the intake manifold). In this example, during the first cycle, the fuel injected and captured is the same for both VVT settings.

$$FR1c = FA1c \quad \text{Equation 9:}$$

Thus, the air-fuel ratio RR1 during the first cycle will be the same in both WT settings.

$$AR1c/FR1c = AA1c/FA1c = RR1 = RA1 \quad \text{Equation 10:}$$

Second cycle (retarded VVT setting): This cycle follows the first cycle and the engine operation has been shifted to the high lift profile mode HL. The VVT setting is unchanged (i.e., it remains retarded). As stated, the VVT system is adjusted so that the amount of air captured is reduced during the second cycle in relation to the first cycle.

$$AR2c < AR1c \quad \text{Equation 11:}$$

The amount of air captured during the second cycle with retarded the VVT setting is equal to the amount of air inducted, reduced by the amount of air pushed back.

$$AR2c = AR2i - AR2pb \quad \text{Equation 12:}$$

According to the above equations 8 and 3, the amount of air captured in the first cycle in both VVT settings, and the amount of air captured in the second cycle with advanced VVT setting are the same.

$$AR1c = AA1c + AA2c \quad \text{Equation 13:}$$

According to equation 2, the amount of air captured during the second cycle with advanced VVT setting is equal to the amount of air inducted reduced by the amount of air push back (i.e., $AA2c = AA2i - AA2pb$). Thus, it follows from equations 11, 12, 13, and 2 that the difference between the amount of air inducted and the amount of air pushed back is smaller in the second cycle when the VVT setting is retarded, compared to when it is advanced.

$$AR2i - AR2pb < AA2i - AA2pb \quad \text{Equation 14:}$$

The fact that the duration of the valve actuation in the high lift profile mode HL is the same in all VVT settings, combined with equation 14, gives that the amount of air inducted in the second cycle is smaller when the VVT setting is retarded, compared to when it is advanced.

$$AR2i < AA2i \quad \text{Equation 15:}$$

The fuel inducted is the same during the second cycle in both VVT settings, see equations 4 and 9.

$$FR2i = FA2i \quad \text{Equation 16:}$$

It follows from equations 15 and 16 that the air-fuel ratio is less in the second cycle when the VVT setting is retarded, as compared to when it is advanced.

$$RR2 < RA2 \quad \text{Equation 17:}$$

Thus, the method reduces or eliminates the lean peak following a valve lift profile mode change from a low lift profile mode LL to a high lift profile mode HL. As a result, an air-fuel mixture can be provided that is sufficiently rich to avoid misfire.

Figure 6:
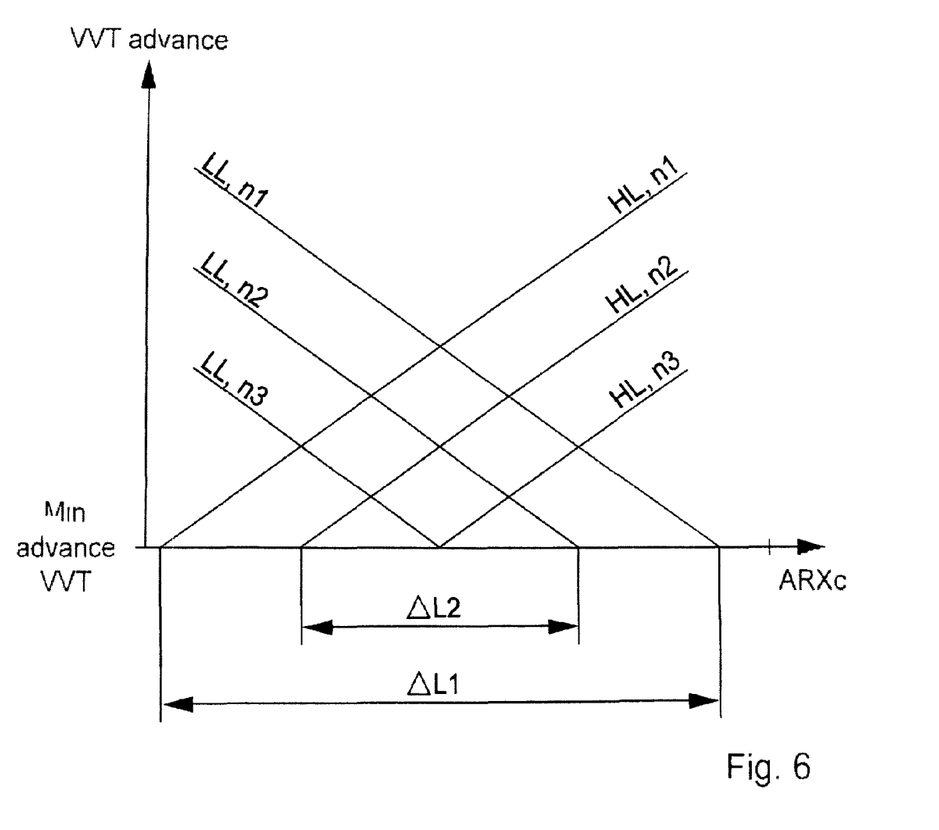
FIG. 6 is a diagram that shows the relationship between load, variable valve timing values, and engine speed for two cam profile modes.

Reference is made to FIG. 6, the ECU 7 stores predetermined data correlating, for each of the CPS modes, values of engine speed (n), the VVT position, intake manifold pressure, and the load. In this example, air captured $ARXc$ in the cylinder(s) at each engine cycle is used to illustrate the load, which in turn can refer to the air load per engine revolution or per combustion event, the engine air mass flow, or any other corresponding parameter known to those of skill in the art. FIG. 6 depicts an example of a part of the correlation data in the ECU 7, showing the VVT position as a function of the air captured $ARXc$ in the cylinder at each engine cycle. The VVT position is also a function of a first, second, and third engine speed (n1, n2, n3) where the first engine speed n1 is lower than the second engine speed n2, which in turn is lower than the third engine speed n3. The VVT position indicates the advance of the valve actuation in relation to the most retarded VVT setting (minimum VVT advance) and is measured in crankshaft degrees. Further, in this example there are two possible CPS modes, the low lift profile mode LL and the high lift profile mode HL, but the method is also applicable to engines having more than two such modes.

It can be seen in FIG. 6 that if the VVT is at the minimum advance position, and a CPS mode shift is carried out from the low to the high lift profile mode (LL to HL) at the relatively low first engine speed n1, the air captured $ARXc$ will decrease as indicated in FIG. 6 with the amount $\Delta L1$, which will as described above, reduce the risk of misfire. At the higher second engine speed n2, the air captured $ARXc$ will decrease at the CPS mode shift with the amount $\Delta L2$, which is lower than $\Delta L1$.

At the third engine speed n3, the CPS mode shift carried out from the low to the high lift profile mode (LL to HL), when the VVT is at the minimum advance position, will give no change in the air captured $ARXc$. Thus, it can be seen that the reduction of air captured during a CPS mode change with a retarded VVT setting is greater at low engine speeds, as compared to high engine speeds.

Is should be noted that the method is equally applicable to engines with variable valve lift profile systems providing more than two valve lift profile modes. It should also be noted that the method according is equally applicable to engines with spark ignition and engines with compressed ignition. Further, the method is applicable to engines with suction induction only, as well as to engines with air charging systems (e.g., turbocharged or supercharged engines).

The invention claimed is:

1. A method for controlling an internal combustion engine, the method comprising:
    operating at least a cylinder of the internal combustion engine;
    in response to a valve lift mode change request, retarding a cam timing of a high lift cam profile and a low lift cam profile from a timing where the high lift cam profile begins opening of an intake valve before top dead center intake stroke of said at least a cylinder to a timing where the high lift cam profile begins opening of the intake valve after top dead center intake stroke of said at least a cylinder; and
    after retarding the cam timing, performing a valve mode change of at least a variably operated valve from the low lift cam profile to the high lift cam profile, said at least a variably operated valve operable in said at least a cylinder.

2. The method of claim 1, wherein the retarding the cam timing of the high lift cam profile and the low lift cam profile adjusts timing of the low lift cam profile from a timing where the low lift cam profile is capable of closing the intake valve before bottom dead center intake stroke of said at least a cylinder to a timing after bottom dead center intake stroke of said at least a cylinder, and where an amount of air inducted into said at least a cylinder via the low lift cam profile before retarding the cam timing is substantially equal to an amount of air inducted into said at least a cylinder via the low lift cam profile after retarding the cam timing.

3. The method of claim 2, wherein retarding the cam timing increases an amount of air pushed back from said at least a cylinder to an intake manifold of the internal combustion engine, and where the amount of air inducted into said at least a cylinder via the low lift cam profile after retarding the cam timing is substantially equal to an amount of air inducted into said at least a cylinder via the high lift cam profile after retarding the cam timing.

4. The method of claim 1, wherein fuel is directly injected into said at least a cylinder, and where maximum lift amounts for the low lift cam profile and the high lift cam profile occur at different timings during a cycle of said at least a cylinder.

5. The method of claim 1, wherein the intake valve opens after top dead center intake stroke and closes after bottom dead center compression stroke when the intake valve is opened with said high lift cam profile during the valve mode change.

6. The method of claim 5, wherein said intake valve opens 130-180 crankshaft degrees before bottom dead center intake stroke of said at least a cylinder and closes 70-120 crankshaft degrees after bottom dead center intake stroke of said at least a cylinder.

7. A method for controlling an internal combustion engine, the method comprising:
operating at least a cylinder of the internal combustion engine;
performing a valve lift mode change of at least a variably operated valve from a lower lift mode to a higher lift mode, said at least a variably operated valve operable in said at least a cylinder; and
adjusting operation of said at least a variably operated valve to reduce an amount of air inducted into said at least a cylinder as part of said valve lift mode change, wherein said valve lift mode change occurs below a first temperature and does not occur above said first temperature.

8. A system for controlling an internal combustion engine having a variably operable valvetrain, the system comprising:
a cylinder including a variably operable valve; and
a controller adjusting a timing of a high lift cam profile and a timing of a low lift cam profile to a retarded timing in response to a valve lift mode change request, the timing of the high lift cam profile retarded from a timing where the high lift cam profile begins opening the variably operable valve before top dead center intake stroke of said cylinder to a timing where the high lift cam profile begins opening the variably operable valve after top dead center intake stroke of said cylinder, the high lift cam profile begins closing said variably operable valve after bottom dead center compression stroke of said cylinder at said retarded timing and at said timing where the high lift cam profile begins opening the variably operable valve before top dead center intake stroke of said cylinder, said timing of said low lift cam profile adjusted from a timing where the low lift cam profile begins opening the variably operable valve before top dead center intake stroke of said cylinder to a timing where the low lift cam profile begins opening the variably operable valve after top dead center intake stroke of said cylinder.

9. The system of claim 8, wherein said valve lift mode change request changes said variably operable valve from said low lift cam profile to said high lift cam profile, and where an amount of air inducted into said cylinder via the low lift cam profile at the timing where the high lift cam profile begins opening the variably operable valve before top dead center intake stroke of said cylinder is substantially equal to an amount of air inducted into said cylinder via the low lift cam profile at the timing where the high lift cam profile begins opening the variably operable valve after top dead center intake stroke of said cylinder.

10. The system of claim 8, wherein a substantial portion of time that said variably operable valve is open occurs in an interval between top dead center and bottom dead center intake stroke of said cylinder while said variably operable valve is opened with the low lift cam profile.

11. The system of claim 8, further comprising a fuel injector for injecting fuel directly into said cylinder, and where maximum lift amounts for the low lift cam profile and the high lift cam profile occur at different timings during a cycle of said cylinder.

12. The system of claim 8, wherein during said valve lift mode change request, said variably operable valve is opened with said high lift cam profile before bottom dead center intake stroke of said cylinder and closes after bottom dead center intake stroke of said cylinder.

13. The system of claim 12, wherein said variably operable valve opens 130-180 crankshaft degrees before bottom dead center intake stroke of said cylinder and closes 70-120 crankshaft degrees after bottom dead center intake stroke of said cylinder.

14. The system of claim 8, wherein said variably operable valve includes an actuator that sets a camshaft at desired angular positions in relation to a crankshaft.

15. The system of claim 14, wherein said actuator is hydraulically or electrically controlled.

16. The system of claim 14, wherein a single cam includes the high lift cam profile and the low lift cam profile.

17. A system for controlling an internal combustion engine having a variably operable valvetrain, the system comprising:
a variably operable valve;
a controller adjusting said variably operable valve to reduce an amount of air inducted into at least a cylinder of said internal combustion engine during a valve lift mode change from a lower valve lift mode to a higher valve lift mode, wherein said controller performs said valve lift mode change below a temperature and does not perform said mode change above said temperature.

18. The system of claim 17, wherein said temperature is a temperature of said internal combustion engine, and where an amount of air inducted into said at least a cylinder via the lower lift valve mode before retarding a cam timing is substantially equal to an amount of air inducted into said at least a cylinder via the lower lift valve mode after retarding the cam timing.

19. A method for controlling an engine, comprising:
operating a cylinder of an internal combustion engine with a variably operable valve;
performing a valve lift mode change, including:
retarding a cam timing of a high lift profile and a low lift profile from a timing where the high lift profile begins opening of an intake valve before top dead center intake stroke of said cylinder to a timing where the high lift profile begins opening of the intake valve after top dead center intake stroke of said cylinder, and where said low lift profile is retarded from a timing where the low lift profile begins opening of the intake valve before top dead center intake stroke of said cylinder to a timing where the low lift profile begins opening of the intake valve after top dead center intake stroke of said cylinder, and where said low lift profile is retarded from a timing where the low lift profile closes the intake valve before bottom dead center intake stroke of said cylinder to a timing where the low lift profile closes the intake valve after bottom dead center intake stroke of said cylinder.

* * * * *